United States Patent Office 3,487,084
Patented Dec. 30, 1969

3,487,084
BIS-POLYQUATERNARY AMMONIUM THIOPHENOXIDES
Robert Ehrlich, Morristown, and Philip Shapiro, Succasunna, N.J., assignors to Thiokol Chemical Corporation, Bristol, Pa., a corporation of Delaware
No Drawing. Filed Apr. 28, 1966, Ser. No. 545,843
Int. Cl. C07d 51/70, 149/42; C06b 7/00
U.S. Cl. 260—268                                4 Claims

ABSTRACT OF THE DISCLOSURE

This invention relates to novel sulfur-containing polyquaternary ammonium compounds, particularly to bis-polyquaternary ammonium thiophenoxides. The compounds are useful as intermediates for the preparation of known bis-polyquaternary ammonium borohydrides and aluminohydrides, which in turn are useful as known reducing agents and as rocket propellants.

---

This invention relates to the preparation of polyquaternary ammonium thiophenoxides useful as intermediates in organic synthesis. More particularly, this invention relates to the preparation of ethylene-bis(trimethylammonium thiophenoxide), N,N,N',N'-tetramethylpiperazinium bis-thiophenoxide and N,N'-dimethyl-1,4-diaziniabicyclo [2.2.2] octane bis-thiophenoxide, which compounds are intermediates in the synthesis of borohydrides and aluminohydrides that are useful as ingredients in rocket propellants.

It is accordingly an object of this invention to provide novel polyquaternary ammonium thiophenoxides.

Another object of this invention is to provide intermediates for synthesis of polyquaternary ammonium aluminohydrides.

A further object of this invention is to provide intermediates for synthesis of polyquaternary ammonium borohydrides.

The above objects are attained by mixing freshly prepared silver oxide with a polyquaternary ammonium iodide in aqueous solution, after which the insoluble mixture of excess silver oxide and precipitated silver iodide is removed by filtration. Thiophenol is added to the filtrate and the mixture stirred at 50° C. under an inert atmosphere. The excess thiophenol and water are then removed by evaporation in vacuo at 45° C. The product is dried at 50° C. in a high vacuum for 4 hours. The removal of water from the product can be done at atmospheric pressure with an increase in the length of the drying cycle.

The reactants are commercially available or can be made using known methods. The products are hygroscopic and easily oxidized, but are stable under an anhydrous, inert atmosphere, such as dry nitrogen.

The reaction mechanism is exemplified by the following:

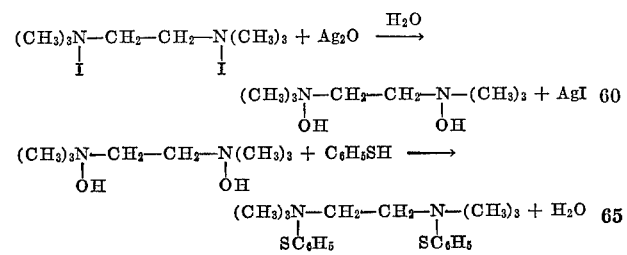

The invention is illustrated by the following examples.

EXAMPLE I

To a solution of 0.10 mole of ethylene-bis(trimethylammonium iodide) in 250 milliliters of $H_2O$ was added 1.20 moles of freshly prepared wet $Ag_2O$. The insoluble mixture of excess $Ag_2O$ and AgI was removed by filtration. To the filtrate was added 0.40 mole of $C_6H_5SH$ and the mixture was stirred 16 hours at 50° C. under $N_2$. The excess $C_6H_5SH$ and $H_2O$ were removed by evaporation in vacuo at 45° C. The pale yellow solid, ethylene-bis(trimethylammonium thiophenoxide), was dried at 50° C. in a high vacuum for 4 hours. The theoretical and experimentally determined percentages by weight of elements in the product were as follows.

*Analysis.*—For $C_{20}H_{32}N_2S_2$. Theoretical: C, 65.88%; H, 8.85%; N, 7.68%; S, 17.59%. Experimental: C, 65.34%; H, 8.22%; N, 7.58%; S, 17.93%.

EXAMPLE II

Using the procedure described in Example I, N,N,N',N'-tetramethylpiperazinium bis-thiophenoxide was prepared by reacting N,N,N',N'-tetramethylpiperazinium iodide with $Ag_2O$ in aqueous solution, filtering to remove excess $Ag_2O$ and AgI, mixing the filtrate with thiophenol, evaporating off the excess thiophenol and water, and drying the product. The theoretical and experimentally determined percentages by weight of elements in the product were as follows.

*Analysis.*—For $C_{20}H_{30}N_2S_2$. Theoretical: C, 66.24%; H, 8.34%; N, 7.73%; S, 17.69%. Experimental: C, 65.69%; H, 8.61%; N, 7.36%; S, 17.00%.

EXAMPLE III

Using the procedure described in Examples I and II, N,N' - dimethyl - 1,4 - diaziniabicyclo [2.2.2] octane bis-thiophenoxide was prepared by reacting N,N'-dimethyl-1,4-diaziniabicyclo [2.2.2] octane bis-iodide with $Ag_2O$, filtering, reacting the filtrate with $C_6H_5SH$, evaporating off excess $C_6H_5SH$ and $H_2O$, and drying the product. The theoretical percentage by weight of sulfur in the product is 17.78; the experimental percentage was 17.50.

What is claimed is:
1. A bis - polyquaternary ammonium thiophenoxide selected from the group consisting of ethylene-bis(trimethylammonium)thiophenoxide, N,N,N',N'- - tetramethylpiperazinium thiophenoxide, and N,N'-dimethyl-1,4-diaziniabicyclo [2.2.2] octane bisthiophenoxide.
2. Ethylene-bis(trimethylammonium thiophenoxide).
3. N,N,N',N'-tetramethylpiperazinium bis-thiophenoxide.
4. N,N'-dimethyl - 1,4 - diaziniabicyclo [2.2.2] octane bis-thiophenoxide.

References Cited

UNITED STATES PATENTS

| | | | |
|---|---|---|---|
| 2,738,369 | 3/1956 | Banus | 260—567.6 |
| 3,018,619 | 1/1962 | Doss. | |
| 3,108,139 | 10/1963 | Larchan | 260—567.6 |
| 3,219,699 | 11/1965 | Ehrlich et al. | 260—567.6 |

ALEX MAZEL, Primary Examiner

D. G. DAUS, Assistant Examiner

U.S. Cl. X.R.

60—35.4; 149—22; 260—448, 567.6, 609.